US007715934B2

(12) United States Patent
Bland et al.

(10) Patent No.: US 7,715,934 B2
(45) Date of Patent: May 11, 2010

(54) IDENTIFICATION OF INPUT FILES USING REFERENCE FILES ASSOCIATED WITH NODES OF A SPARSE BINARY TREE

(75) Inventors: William Bland, Mountain View, CA (US); James Edward Moore, Colchester (GB)

(73) Assignee: Macrovision Corporation, Santa Clara, CA (US)

( * ) Notice: Subject to any disclaimer, the term of this patent is extended or adjusted under 35 U.S.C. 154(b) by 1452 days.

(21) Appl. No.: 10/963,306

(22) Filed: Oct. 12, 2004

(65) Prior Publication Data
US 2005/0216433 A1    Sep. 29, 2005

Related U.S. Application Data

(63) Continuation-in-part of application No. 10/472,458, filed on Sep. 19, 2003, now abandoned.

(60) Provisional application No. 60/568,881, filed on May 6, 2004.

(51) Int. Cl.
*G06F 17/00* (2006.01)
(52) U.S. Cl. ............................. 700/94; 704/211; 707/4; 707/104.1
(58) Field of Classification Search .................. 700/94; 704/231, 243, 244, 245; 707/1, 3, 4, 5, 6, 707/100, 102, E17.101, E17.102, E17.103
See application file for complete search history.

(56) References Cited

U.S. PATENT DOCUMENTS 4,790,017 A * 12/1988 Hinton ........................ 704/243

| 5,437,050 A | 7/1995 | Lamb et al. |
| 5,708,759 A | 1/1998 | Kemeny |

(Continued)

FOREIGN PATENT DOCUMENTS

WO    WO 01/11496 A2    2/2001

(Continued)

OTHER PUBLICATIONS

Chawathe, Yatin et al., "Making Gnutella-like P2P Systems Scalable", SIGCOMM '03, 'Online!, Aug. 25, 2003, XP002315870, Karlsruhe, Germany, pp. 407-418.

(Continued)

*Primary Examiner*—Walter F Briney, III
(74) *Attorney, Agent, or Firm*—Victor H. Okumoto; Andy T. Pho

(57) ABSTRACT

An input profile is generated from an input audio file using a measurable attribute that was also used to generate reference profiles from reference audio files. The input profile is then subjected to a process that was also used to generate a reference profiles tree, which is structured as a sparse binary tree, from the reference profiles. As a result of the process, information of reference profiles having similar characteristics as the input profile, with respect to the measurable attribute, are retrieved from resulting nodes of the reference profiles tree. The input profile is then compared with this subset of the reference profiles, representing potential matches, to determine that either it matches one of the reference profiles, or that it is a spoof, or that it does not match any of the reference profiles.

38 Claims, 15 Drawing Sheets

U.S. PATENT DOCUMENTS

| | | | |
|---|---|---|---|
| 5,914,714 | A | 6/1999 | Brown |
| 5,918,223 | A | 6/1999 | Blum et al. |
| 5,925,843 | A | 7/1999 | Miller et al. |
| 5,956,671 | A | 9/1999 | Ittycheriah et al. |
| 5,978,791 | A | 11/1999 | Farber et al. |
| 6,188,010 | B1 | 2/2001 | Iwamura |
| 6,415,280 | B1 | 7/2002 | Farber et al. |
| 6,502,125 | B1 | 12/2002 | Kenner et al. |
| 6,553,403 | B1 | 4/2003 | Jarriel et al. |
| 6,625,643 | B1 | 9/2003 | Colby et al. |
| 6,665,726 | B1 | 12/2003 | Leighton et al. |
| 6,678,680 | B1 | 1/2004 | Woo |
| 6,708,212 | B2 | 3/2004 | Porras et al. |
| 6,732,180 | B1 | 5/2004 | Hale et al. |
| 6,799,221 | B1 | 9/2004 | Kenner et al. |
| 6,892,227 | B1 | 5/2005 | Elwell et al. |
| 6,947,386 | B2 | 9/2005 | Temudo de Castro et al. |
| 6,981,180 | B1 | 12/2005 | Bailey et al. |
| 7,020,701 | B1 | 3/2006 | Gelvin et al. |
| 7,100,199 | B2 | 8/2006 | Ginter et al. |
| 7,111,061 | B2 | 9/2006 | Leighton et al. |
| 7,120,800 | B2 | 10/2006 | Ginter et al. |
| 7,136,922 | B2 | 11/2006 | Sundaram et al. |
| 7,143,170 | B2 | 11/2006 | Swildens et al. |
| 7,155,723 | B2 | 12/2006 | Swildens et al. |
| 7,185,052 | B2 | 2/2007 | Day |
| 7,194,522 | B1 | 3/2007 | Swildens et al. |
| 7,203,753 | B2 | 4/2007 | Yeager et al. |
| 7,313,619 | B2 | 12/2007 | Torrant et al. |
| 7,356,487 | B2 | 4/2008 | Kitze |
| 7,363,278 | B2 | 4/2008 | Schmelzer et al. |
| 7,376,749 | B2 | 5/2008 | Loach et al. |
| 7,409,644 | B2 | 8/2008 | Moore et al. |
| 7,490,149 | B2 | 2/2009 | Omote et al. |
| 2001/0037314 | A1 | 11/2001 | Ishikawa |
| 2002/0065880 | A1 | 5/2002 | Hasegawa et al. |
| 2002/0082999 | A1 | 6/2002 | Lee et al. |
| 2002/0083060 | A1* | 6/2002 | Wang et al. ............ 707/10 |
| 2002/0087885 | A1 | 7/2002 | Peled et al. |
| 2002/0099955 | A1 | 7/2002 | Peled et al. |
| 2002/0120859 | A1 | 8/2002 | Lipkin et al. |
| 2002/0141387 | A1 | 10/2002 | Orshan |
| 2002/0143894 | A1 | 10/2002 | Takayama |
| 2002/0152173 | A1 | 10/2002 | Rudd |
| 2002/0152261 | A1 | 10/2002 | Arkin et al. |
| 2002/0152262 | A1 | 10/2002 | Arkin et al. |
| 2002/0174216 | A1 | 11/2002 | Shorey et al. |
| 2002/0194108 | A1 | 12/2002 | Kitze |
| 2003/0023421 | A1 | 1/2003 | Finn et al. |
| 2003/0028889 | A1 | 2/2003 | McCoskey et al. |
| 2003/0056118 | A1 | 3/2003 | Troyansky et al. |
| 2003/0061287 | A1 | 3/2003 | Yu et al. |
| 2003/0070070 | A1 | 4/2003 | Yeager et al. |
| 2003/0093794 | A1 | 5/2003 | Thomas et al. |
| 2003/0095660 | A1 | 5/2003 | Lee et al. |
| 2003/0097299 | A1 | 5/2003 | O'Kane et al. |
| 2003/0130953 | A1 | 7/2003 | Narasimhan et al. |
| 2003/0135548 | A1 | 7/2003 | Bushkin |
| 2003/0233541 | A1 | 12/2003 | Fowler et al. |
| 2003/0236787 | A1* | 12/2003 | Burges ............ 707/10 |
| 2004/0010417 | A1 | 1/2004 | Peled |
| 2004/0030691 | A1 | 2/2004 | Woo |
| 2004/0030743 | A1 | 2/2004 | Hugly et al. |
| 2004/0031038 | A1 | 2/2004 | Hugly et al. |
| 2004/0034798 | A1 | 2/2004 | Yamada et al. |
| 2004/0093354 | A1 | 5/2004 | Xu et al. |
| 2004/0103280 | A1 | 5/2004 | Balfanz et al. |
| 2004/0107215 | A1 | 6/2004 | Moore et al. |
| 2004/0139329 | A1 | 7/2004 | Abdallah et al. |
| 2004/0181688 | A1 | 9/2004 | Wittkotter |
| 2005/0075119 | A1 | 4/2005 | Sheha et al. |
| 2005/0089014 | A1 | 4/2005 | Levin et al. |
| 2005/0091167 | A1 | 4/2005 | Moore et al. |
| 2005/0105476 | A1 | 5/2005 | Gotesdyner et al. |
| 2005/0108378 | A1 | 5/2005 | Patterson et al. |
| 2005/0114709 | A1 | 5/2005 | Moore |
| 2005/0147044 | A1 | 7/2005 | Teodosiu et al. |
| 2005/0154681 | A1 | 7/2005 | Schmelzer |
| 2005/0198317 | A1 | 9/2005 | Byers |
| 2005/0198535 | A1 | 9/2005 | Basche et al. |
| 2005/0203851 | A1 | 9/2005 | King et al. |
| 2005/0265367 | A1 | 12/2005 | Teodosiu et al. |
| 2005/0267945 | A1 | 12/2005 | Cohen et al. |
| 2006/0015936 | A1 | 1/2006 | Illowsky et al. |
| 2006/0149806 | A1 | 7/2006 | Scott et al. |
| 2007/0074019 | A1 | 3/2007 | Seidel |
| 2007/0143405 | A1 | 6/2007 | Bland et al. |

FOREIGN PATENT DOCUMENTS

| | | |
|---|---|---|
| WO | WO 01/77775 A2 | 10/2001 |
| WO | WO 02/075595 A1 | 9/2002 |
| WO | WO 02/077847 A1 | 10/2002 |
| WO | WO 02/082271 A1 | 10/2002 |
| WO | WO 2005/006157 A1 | 1/2005 |
| WO | WO 2005/043359 A1 | 5/2005 |
| WO | WO 2005/043819 A2 | 5/2005 |
| WO | WO 2005/046174 A1 | 5/2005 |
| WO | WO 2005/084252 A2 | 9/2005 |
| WO | WO 2006/041742 A2 | 4/2006 |
| WO | WO 2006/086158 A2 | 8/2006 |

OTHER PUBLICATIONS

Cuenca-Acuna, F M, et al., Autonomous Replication for High Availability in Unstructured P2P Systems, Reliable Distributed Systems, 2003. Proceedings. 22nd International Symposium on Oct. 6-8, 2003, Piscataway, NJ, USA, IEEE, Oct. 6, 2003, pp. 99-108.

Dias, D M., et al., A Scalable and Highly Available Web Server, Feb. 25, 1996, Digest Of Papers Of Compcon (Computer Society Conference) 1996 Technologies For The Information Superhighway. Santa Clara, Feb. 25-28, 1996, Digest Of Papers Of The Computer Society Computer Conference Compcon, Los Alamitos, IEEE Comp. Soc. Press, 8 pages.

Lee, C Y, Application of a cross decomposition algorithm to a location and allocation problem in distributed systems, Computer Communications, Elsevier Science Publishers BV, Amsterdam, NL, vol. 18, No. 5, May 1995, pp. 367-377.

Lichtman, D, Jacobson, D., Anonymity a Double-Edged Sword for Pirates Online, The Chicago Tribune, Apr. 13, 2000, 2 pages.

Neild, L L, et al., Investigating Peer-to-peer Systems for Resource Sharing within a Small Group of Nodes, Information Technology : Coding and Computing, 2004. Proceedings. ITCC 2004, International Conference On Las Vegas, NV, USA, Apr. 5-7, 2004, Piscataway, NJ, USA, IEEE, vol. 2, Apr. 5, 2004, pp. 400-404.

Oliveira, L B E, et al., Evaluation of Ad-Hoc Routing Protocols under a Peer-to-Peer Application, Mar. 16, 2003, Wireless Communications And Networking, 2003. WCNC 2003. 2003 IEEE Mar. 16-20, 2003, Piscataway, NJ, USA, IEEE, pp. 1143-1148.

Ozmutlu S, et al., A day in the life of Web searching : an exploratory study, Information Processing & Management Elsevier, Barking GB, vol. 40, No. 2, Mar. 2004, pp. 319-345.

Pastor, L, et al., An Efficiency and Scalability Model for Heterogeneous Clusters, 42nd Annual Symposium On Foundations Of Computer Science. (FOCS 2001). Las Vegas, Oct. 14-17, 2001. Annual Symposium On Foundations Of Computer Science, Los Alamitos, CA : IEEE Comp. Soc, US, Oct. 8, 2001, pp. 427-434.

Schroeder, T, et al., Scalable Web Server Clustering Technologies, IEEE Network, IEEE Inc. New York, US, vol. 14, No. 3, May 2000, pp. 38-45.

PCT Search Report for PCT/US2004/029798 mailed Dec. 21, 2004, 2 pages.

PCT Search Report for PCT/US2004/029869 mailed Feb. 22, 2005, 2 pages.

PCT Search Report for PCT/US2004/029685 mailed Apr. 27, 2005, 3 pages.
PCT Search Report for PCT/US05/15643 mailed Jan. 13, 2006, 1 page.
PCT Search Report for PCT/GB02/01347 dated Aug. 21, 2002, 2 pages.
Ito, Mabo Robert, et al., Zero-Crossing Measurements for Analysis and Recognition of Speech Sounds, IEEE Transactions On Audio and Electroacoustics, vol. AU-19, No. 3, Sep. 1971, pp. 235-242.
Patent Abstracts of Japan, Publication No. 2000-322080, Mitsubishi Electric Corp, published : Nov. 24, 2000, 1 pg.
Cuenca-Acuna, F., et al., Autonomous Replication for High Availability in Unstructured P2P Systems, Technical Report, Dept. of Computer Science, Rutgers University, Apr. 24, 2003, pp. 1-21.
Dijker, Barb, Re : [SAGE] IP Assignment Map ???, Aug. 20, 2001, http://www.sage.org/lists/sage-members-archive/2001/msg01063.html, pp. 1-2.
Hubbard, K., et al., RFC 2050, Obsoletes : 1466: Internet Registry IP Allocation Guidelines, Nov. 1996, http://www.ietf.org/rfc/rfc2050.txt?number=2050, pp. 1-13.
Kedem, Benjamin., Spectral Analysis and Discrimination by Zero-Crossings, Proceedings Of The IEEE, IEEE, New York, NY, U.S.A., vol. 74, No. 11, Nov. 1, 1986, pp. 1477-1493.
Ooghe, Sven, et al., Impact of the Evolution of the Metropolitan Network on the DSL Access Architecture, IEEE Communications Magazine, Feb. 2003, pp. 140-145.

Parlante, Nick, IP Routing, Handout # 5, Spring, 2001-2002, Stanford, pp. 1-6.
Passarge, Elke, Layer 4 switching : The magic combination, Network World, Feb. 15, 1999, http://www.networkworld.com/newsletters/lans/0215lan1.html, pp. 1-3.
Rybczynski, Tony, Nortel : Layer 4 switching is an illusion, Network World, Feb. 8, 1999, http://www.networkworld.com/forum/0208layer4no.html, pp. 1-3.
Saunders, John, Real-Time Discrimination Of Broadcast Speech/Music, IEEE International Conference On Acoustics, Speech, And Signal Processing—Proceedings, (ICASSP), Atlanta, May 7-10, 1996 ; [IEEE International Conference On Acoustics, Speech, And Signal Processing—Proceedings. (ICASSP)], New York, NY, U.S.A., vol. 2, May 7, 1996, pp. 993-996.
Smith, Gavin, et al., Quick Audio Retrieval Using Active Search, Proc. Of 1998 IEEE ICASSP, May 12, 1998, vol. 6, pp. 3777-3780.
Socolofsky, T., et al., Request for Comments : 1180, A TCP/IP Tutorial, Jan. 1991, http://tools.ietf.org/html/rfc1180, pp. 1-28.
VPN—Virtual private Networking, an overview, Jan. 24, 2002, http://web.archive.org/web/20020124162522/http://homenethelp.com/vpn/, pp. 1-2.
Vishnumurthy, V., Karma: A Secure Economic Framework for Peer-to-Peer Resource Sharing, Department of Computer Science, Cornell University, Year: 2003; pp. 1-6.

* cited by examiner

IDENTIFICATION OF INPUT FILES USING REFERENCE FILES ASSOCIATED WITH NODES OF A SPARSE BINARY TREE

CROSS REFERENCE TO RELATED APPLICATIONS

This application claims priority to U.S. Provisional Application Ser. No. 60/568,881 filed May 6, 2004, which is incorporated herein by reference; and is a continuation-in-part of commonly-owned U.S. application Ser. No. 10/472,458, filed Sep. 19, 2003, now abandoned entitled "Method and Apparatus for Identifying Electronic Files," which is also incorporated herein by reference.

FIELD OF THE INVENTION

The present invention generally relates to techniques for identifying digitized samples of time varying signals and in particular, to a method and apparatus for identifying input files using reference files associated with nodes of a sparse binary tree.

BACKGROUND OF THE INVENTION

In searching for particular audio files on the Internet, it is useful to be able to determine the identity of untitled audio files as well as to confirm that titled audio files are what they purport to be. Although a human may conceivably make such determinations and confirmations by simply listening to the content of the audio files by playing them through a media player, such an approach is not always reliable. Also, a process such as this involving human judgment is inherently very slow.

Therefore, it is advantageous to employ a computer to determine the identity of untitled audio files as well as to confirm that titled audio files are what they purport to be. The computer can not only store a lot of information to assist in identifying an input audio file, it can also process that information very quickly.

In one technique employing a computer, an algorithm is used to uniquely identify audio file content. Using this approach, a master code is generated by performing the algorithm on content in a master audio file. By applying the same algorithm to the content of an input audio file, the calculated code may then be compared with the master code to determine a match.

Use of such an algorithm, however, does not always lead to proper identification, because the content of an audio file may not have exactly the same length of recording as the content of the master audio file, for example, by starting at a point a little later in time, thus giving rise to a calculated code that would not match the master code. Also, if the content of the input audio file contains noise spikes or background noise, this would also give rise to a calculated code that would not match the master code. Thus, in both of these cases, the stored content is not properly identified.

OBJECTS AND SUMMARY OF THE INVENTION

Accordingly, one object of the present invention is to provide a method and apparatus for identifying input files that are reliable even if their content is offset in time, or contains noise spikes or background noise.

Another object is to provide a method and apparatus for identifying input files that are computationally fast when performed in a computer system.

Another object is to provide a method and apparatus for identifying input files that minimize data storage requirements in a computer system.

These and other objects are accomplished by the various aspects of the present invention, wherein briefly stated, one aspect is a method for matching an input audio file with reference audio files, comprising: identifying potential matches of an input audio file among reference audio files based upon at least one common characteristic; and searching for a match of the input audio file among the potential matches.

Another aspect is a method for matching an input audio file with reference audio files, comprising: identifying potential matches of an input audio file among reference audio files based upon at least one common characteristic; and comparing an input profile resulting from a measurable attribute of the input audio file with reference profiles resulting from the same measurable attribute of the potential matches to determine a match.

Another aspect is a method for matching an input file with reference files, comprising: identifying potential matches of an input file among reference files by associating nodes of a sparse binary tree with the input file in a same manner used to associate nodes of the sparse binary tree with the reference files; and searching for a match of the input file among the potential matches.

Another aspect is a method for matching an input file with reference files, comprising: identifying potential matches of an input file among reference files by associating nodes of a sparse binary tree with the input file in a same manner used to associate nodes of the sparse binary tree with the reference files; and comparing a profile resulting from a measurable attribute of the input file with profiles resulting from the same measurable attribute of the potential matches to determine a match.

Another aspect is a method for matching an input audio file with reference audio files, comprising: generating an input profile from an input audio file based upon a measurable attribute also used to generate reference profiles from reference audio files; identifying potential matches among the reference profiles with the input profile by processing the input profile in a manner used to associate individual of the reference profiles with nodes of a sparse binary tree; and comparing the input profile with the potential matches to determine a match.

Still another aspect is a method for matching an input audio file with reference audio files, comprising: generating reference profiles from reference audio files using a measurable attribute; generating a sparse binary tree by applying a process to the reference profiles such that identifications of the reference profiles are associated at resulting nodes of the sparse binary tree; generating an input profile from the input audio file using the measurable attribute; applying the process to the input profile so that associated reference profiles are identified from resulting nodes of the sparse binary tree; and comparing at least a portion of the input profile with corresponding portions of the identified reference profiles to determine a match.

Another aspect is an apparatus for matching an input audio file with reference audio files, comprising at least one computer configured to: identify potential matches of an input audio file among reference audio files based upon at least one common characteristic; and search for a match of the input audio file among the potential matches.

Another aspect is an apparatus for matching an input audio file with reference audio files, comprising at least one computer configured to: identify potential matches of an input audio file among reference audio files based upon at least one common characteristic; and compare an input profile resulting from a measurable attribute of the input audio file with reference profiles resulting from the same measurable attribute of the potential matches to determine a match.

Another aspect is an apparatus for matching an input file with reference files, comprising at least one computer configured to: identify potential matches of an input file among reference files by associating nodes of a sparse binary tree with the input file in a same manner used to associate nodes of the sparse binary tree with the reference files; and search for a match of the input file among the potential matches.

Another aspect is an apparatus for matching an input file with reference files, comprising at least one computer configured to: identify potential matches of an input file among reference files by associating nodes of a sparse binary tree with the input file in a same manner used to associate nodes of the sparse binary tree with the reference files; and compare a profile resulting from a measurable attribute of the input file with profiles resulting from the same measurable attribute of the potential matches to determine a match.

Another aspect is an apparatus for matching an input audio file with reference audio files, comprising at least one computer configured to: generate an input profile from an input audio file based upon a measurable attribute also used to generate reference profiles from reference audio files; identify potential matches among the reference profiles with the input profile by processing the input profile in a manner used to associate individual of the reference profiles with nodes of a sparse binary tree; and compare the input profile with the potential matches to determine a match.

Yet another aspect is an apparatus for matching an input audio file with reference audio files, comprising at least one computer configured to: generate reference profiles from reference audio files using a measurable attribute; generate a sparse binary tree by applying a process to the reference profiles such that identifications of the reference profiles are associated at resulting nodes of the sparse binary tree; generate an input profile from the input audio file using the measurable attribute; apply the process to the input profile so that associated reference profiles are identified from resulting nodes of the sparse binary tree; and compare at least a portion of the input profile with corresponding portions of the identified reference profiles to determine a match.

Additional objects, features and advantages of the various aspects of the present invention will become apparent from the following description of its preferred embodiment, which description should be taken in conjunction with the accompanying drawings.

DETAILED DESCRIPTION OF THE PREFERRED EMBODIMENT

All methods, generators and programs described herein are preferably performed on one or more computers cooperating together such as in a distributed or other processing environment.

Figure 1:
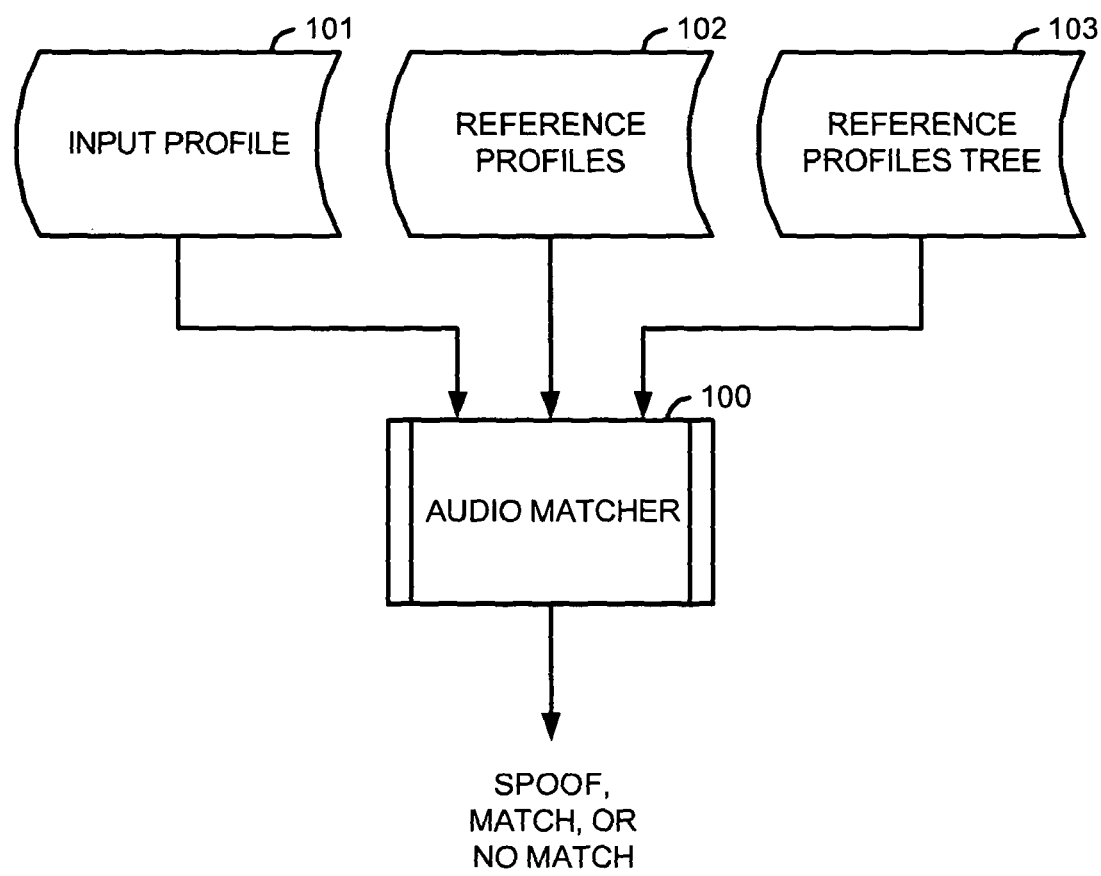
FIG. 1 illustrates a data flow diagram for an audio matcher program, utilizing aspects of the present invention.

Referring to FIG. 1, an audio matcher program 100 matches an input profile 101 of an input audio clip to one of a store of reference profiles 102 of reference audio clips. In addition to the input profile 101 and the reference profiles 102, a reference profiles tree 103 is also used by the audio matcher 100 to facilitate and expedite the matching process, which in this case, results in one of the following outcomes: a determination that the input profile 101 is a spoof (for example, its corresponding input audio clip is not what it purports to be), or an identification of an acceptable best match for the input profile 101 among the reference profiles 102, or a determination that no acceptable match has been found for the input profile 101 among the reference profiles 102.

The reference audio clips in this case may be published music that is protected by copyright law, and the input audio clips may be audio files either residing on user computers or being transmitted through the Internet using a file sharing network. Formats for the audio clips may be any standard format such as MP3.

Figure 2:
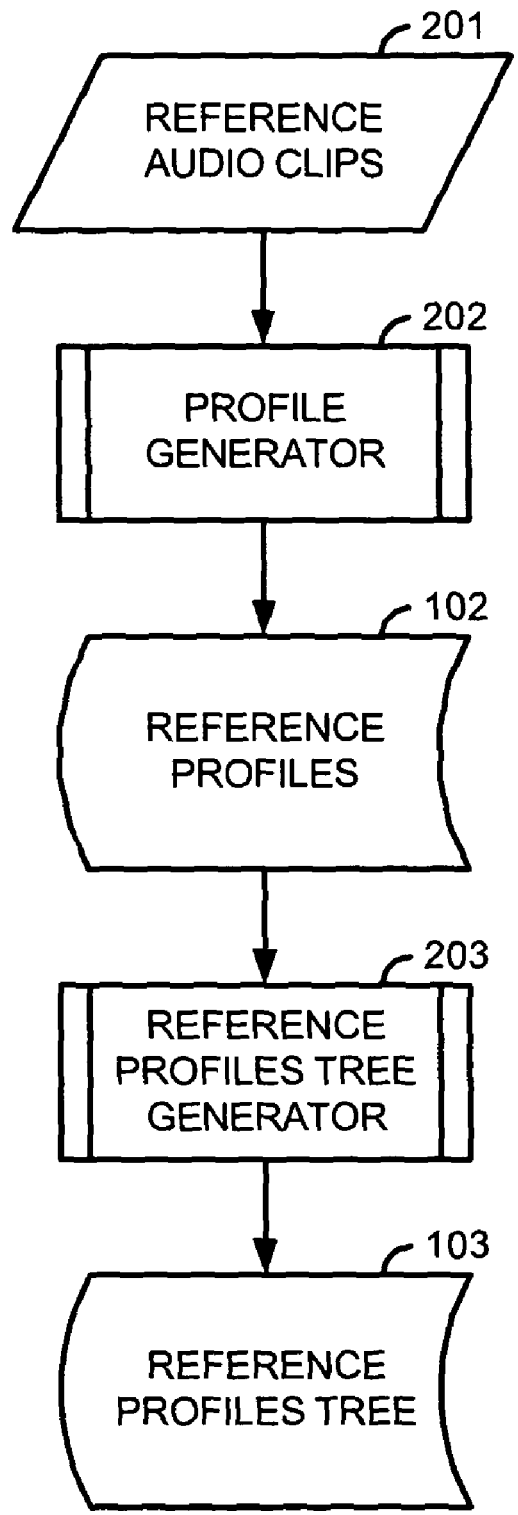
FIG. 2 illustrates a flow diagram of a method for generating reference profiles and a reference profiles tree, utilizing aspects of the present invention.

FIG. 2 illustrates, as an example, a method by which the reference profiles and the reference profiles tree are generated. In particular, a profile generator 202 generates the reference profiles 102 from corresponding reference audio clips 201. A reference profiles tree generator 203 then generates a references profiles tree 103 from the reference profiles 102.

The format of the reference profiles tree 103 is a sparse binary tree in order to minimize data storage requirements and maximize search performance.

Figure 3:
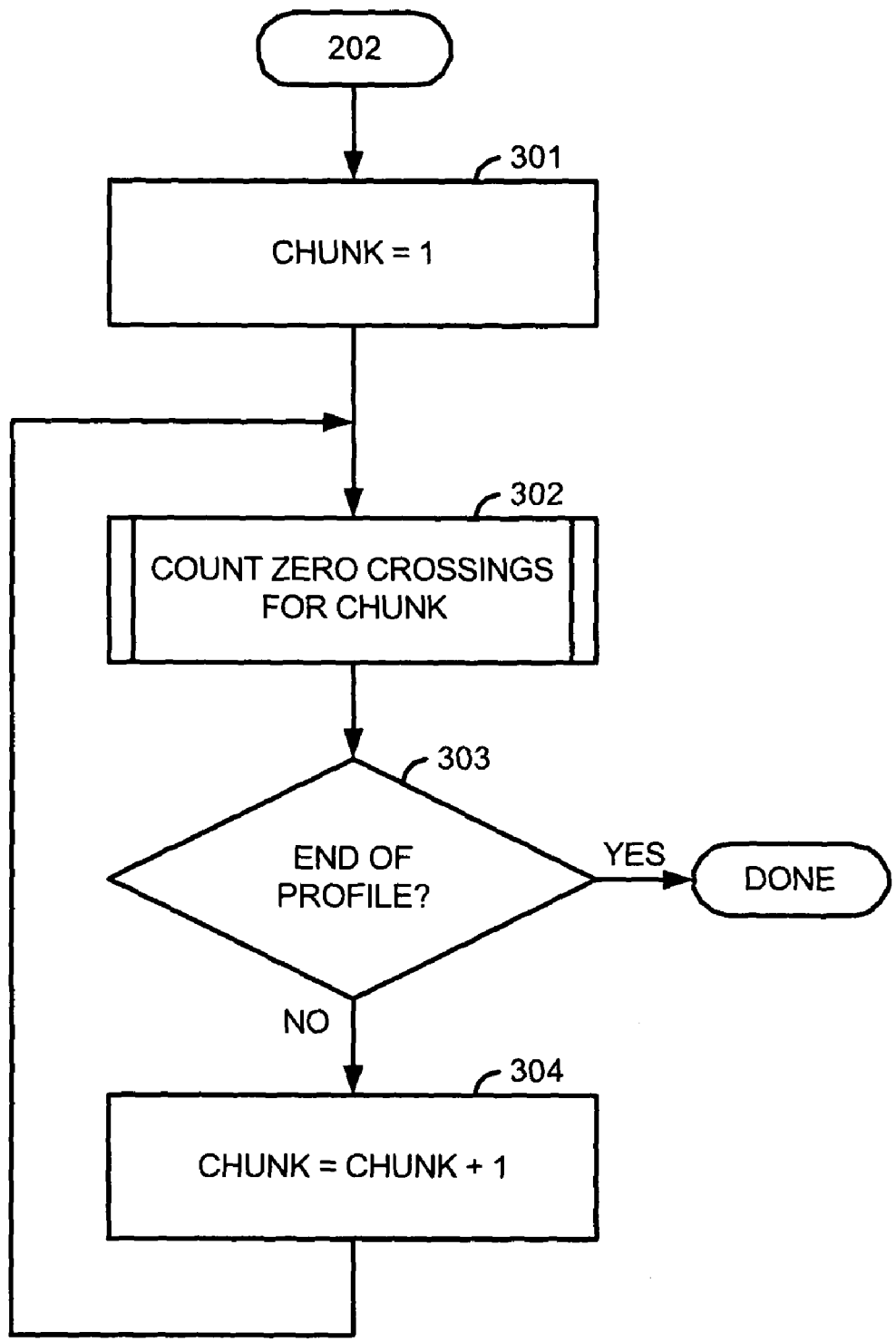
FIG. 3 illustrates a flow diagram of a method for generating profiles from digitized audio clips, utilizing aspects of the present invention.

FIG. 3 illustrates, as an example, a method performed by the profile generator 202 to generate profiles from digitized audio clips. In the method, a chunk represents a programmable period of time such as 0.1 seconds of the audio clip. In 301, digitized sample information for a first chunk of the audio clip is serially read, and in 302, the number of zero crossings in the chunk is counted. A zero crossing occurs each time the sign changes between adjacent samples. In 303, a determination is made whether the current chunk is a last chunk in the profile. If the determination results in a YES, then the profile generator 202 terminates. On the other hand, if the determination is NO, then in 304, digitized sample information for a next chunk of the audio clip is serially read, and the process continues by jumping back to 302 and repeating 302~304 until the last chunk in the profile has been processed through 302.

Figure 7:
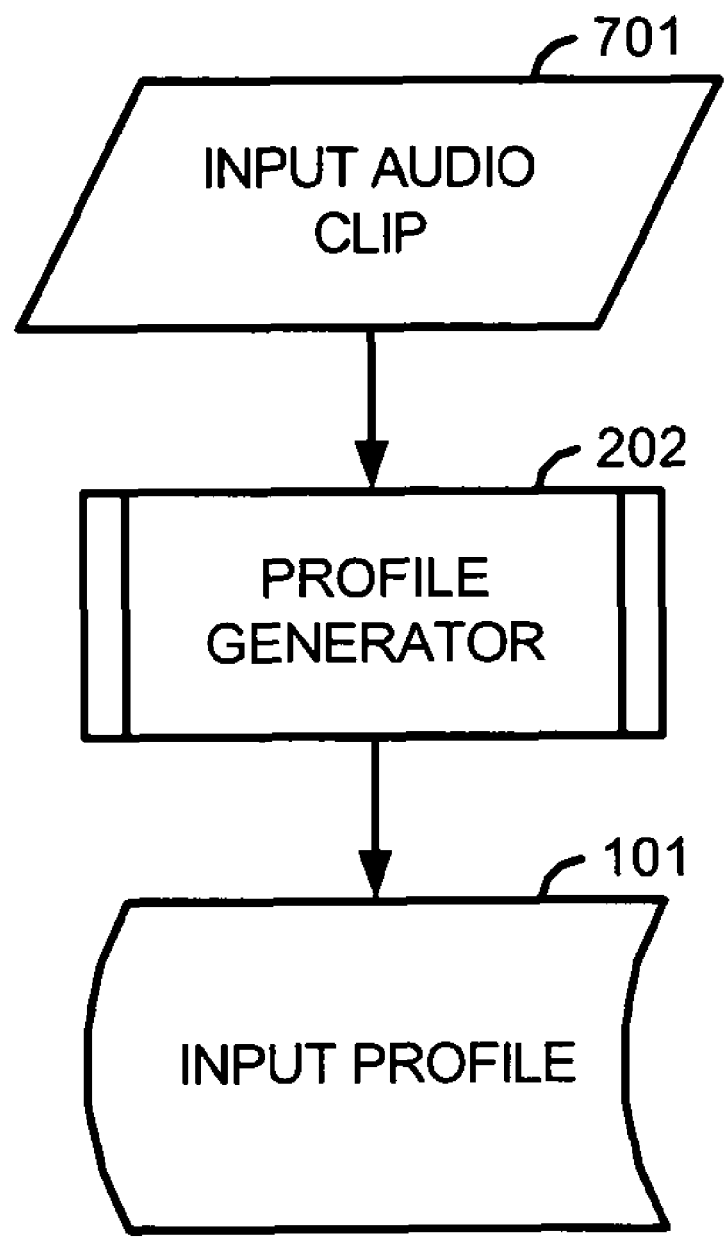
FIG. 7 illustrates a flow diagram of a method for generating an input profile from an input audio clip.

The profile generator 202 is used to generate reference profiles 102 from reference audio clips 201 (as shown in FIG. 2) and to generate an input profile 101 from an input audio clip 701 (as shown in FIG. 7). In addition to counting zero crossings as described in reference to FIG. 3, the profile generator 202 may also generate other information such as amplitude ratios between successive chunks to better characterize audio clips in its generated profiles and improve matching accuracy by the audio matcher 100 through the use of such enhanced profiles.

Figure 4:
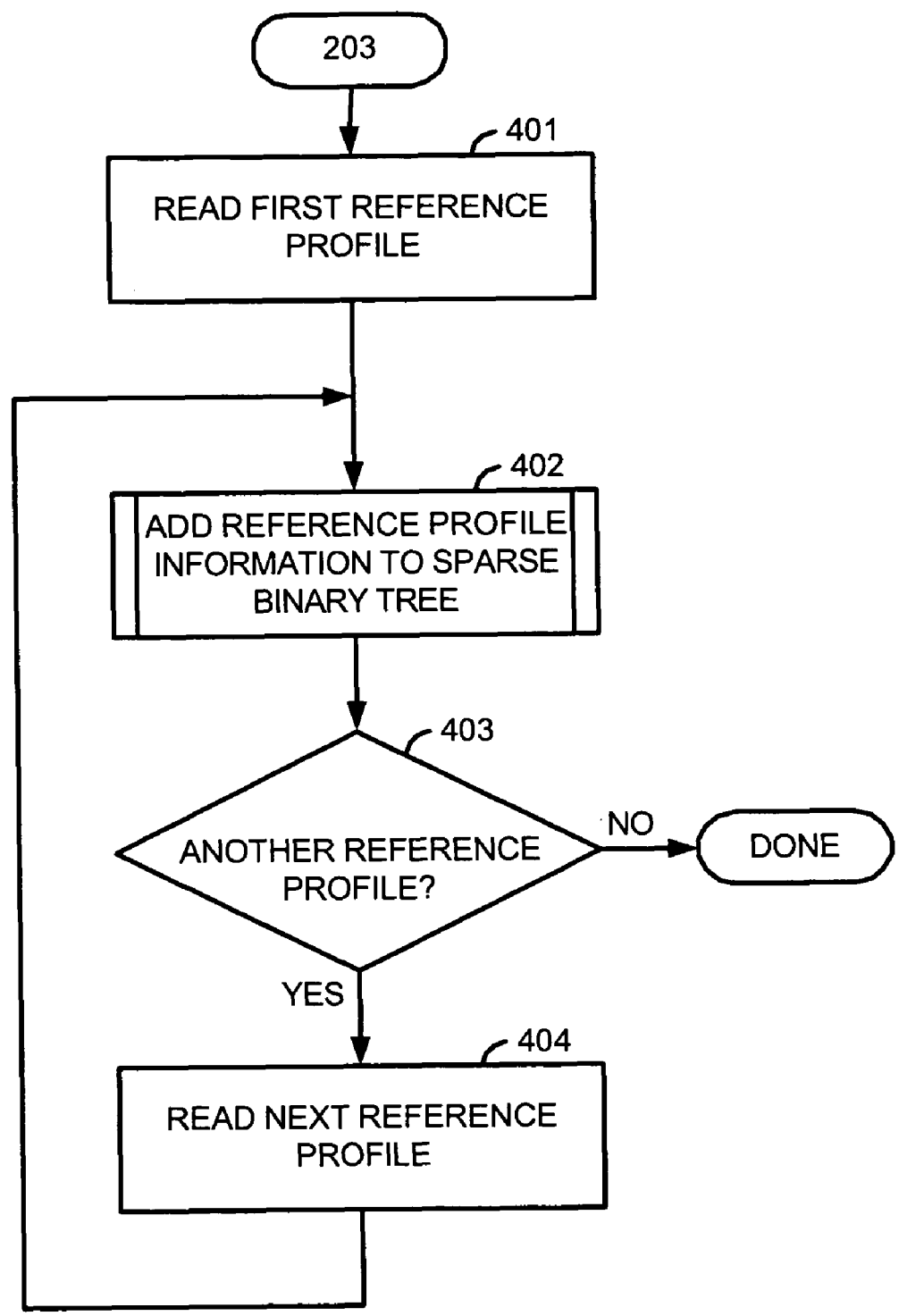
FIG. 4 illustrates a flow diagram of a method for generating a reference profiles tree, utilizing aspects of the present invention.

FIG. 4 illustrates, as an example, a method performed by the reference profiles tree generator 203 to generate a reference profiles tree 103 by including reference profile information for each of the reference profiles 102 in it. As previously described, the reference profiles tree 103 is generated as a sparse binary tree.

Figure 5:
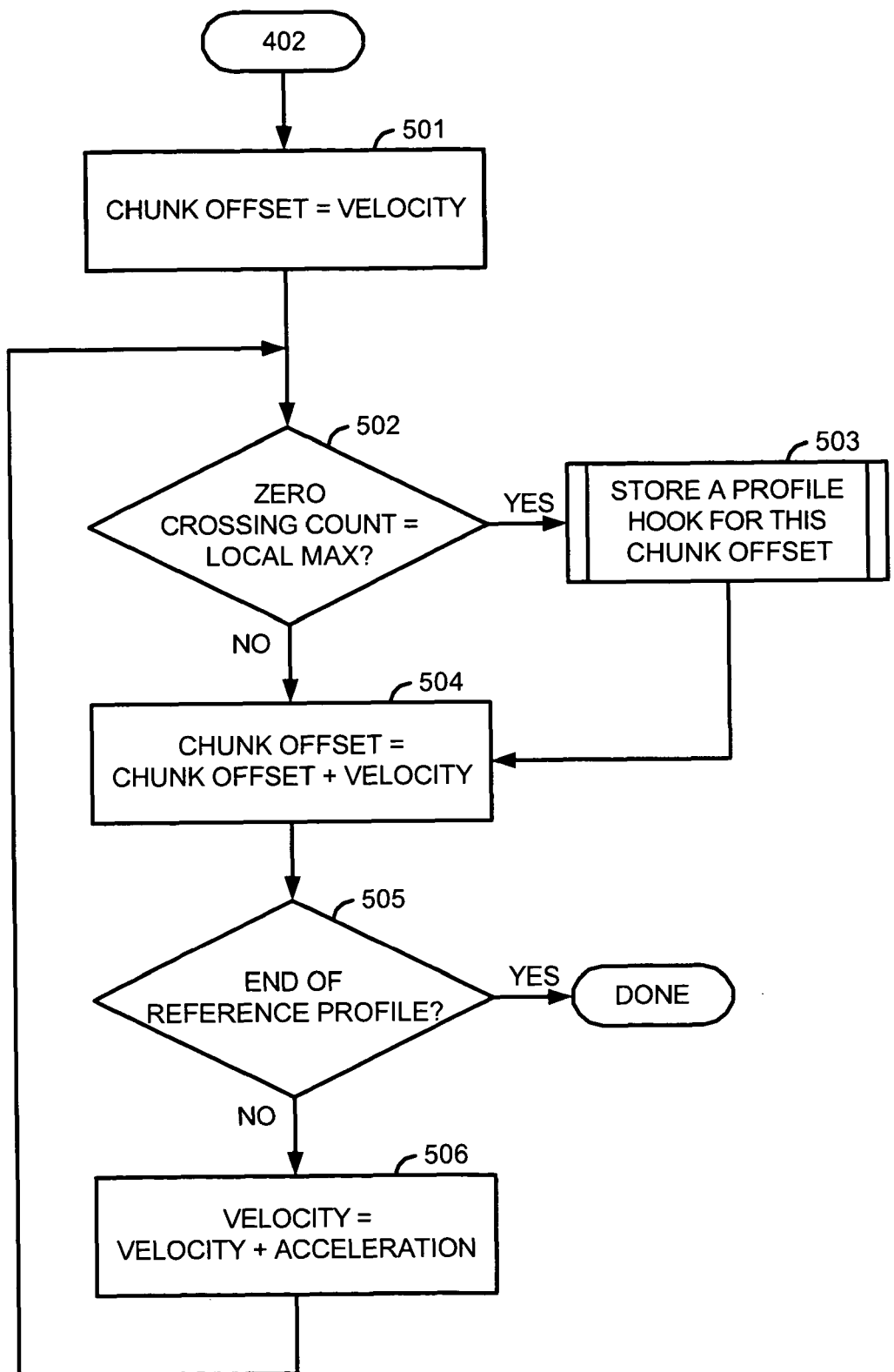
FIG. 5 illustrates a flow diagram of a method for associating reference profile information with nodes of a reference profiles tree, utilizing aspects of the present invention.

FIG. 5 illustrates, as an example, a method performed in function 402 of FIG. 4 to add reference profile information to the reference profiles tree 103. As noted in FIG. 4, this method will be performed for each of the reference profiles 102, so that information of all of the reference profiles will be stored in the same reference profiles tree 103. The reference profiles tree 103 and particularly, its sparse binary tree architecture, will subsequently be used by the audio matcher to significantly speed up the matching process.

As used herein, the term "chunk offset" means the difference in number of chunks between a current chunk of the reference profile and a first chunk of the reference profile, plus one. Thus, the number of the chunk is equal to the chunk offset in this convention.

Two programmable parameters are used in the method. The term "velocity" means the number of chunks between local maximums in the reference profile, and the term "acceleration" means the change in velocity divided by the number of chunks over which the change occurs. Initial values for velocity and acceleration are pre-defined prior to performance of the function 402. As an example, the initial velocity may be set to 1, and the initial acceleration may also be set to 1. The velocity is then modified according to the method. The acceleration, on the other hand, is generally constant at its initial value.

In 501, the chunk offset is initialized to be equal to the initial velocity. In 502, a determination is made whether the zero crossing count for the current chunk is a local maximum. To be considered a local maximum, the zero crossing count for the current chunk must be greater by a programmed threshold value than both the zero crossing count for the chunk right before the current chunk and the zero crossing count for the chunk right after the current chunk. In situations where the current chunk does not have either a chunk right before it (i.e., it is the first chunk in the reference profile) or a chunk right after it (i.e., it is the last chunk in the reference profile), a zero will be assumed for the zero crossing count in those cases.

If the determination in 502 is YES, then in 503, a profile hook for this chunk offset is stored in the reference profiles tree 103. Additional details on 503 are described in reference to FIG. 6 below.

On the other hand, if the determination in 502 is NO, then in 504, the chunk offset is incremented by the velocity.

In 505, a determination is then made whether the end of the reference file has been reached. This determination would be YES, if the new chunk offset is greater than the chunk number of the last chunk in the reference profile. Therefore, if the determination in 505 is YES, then the method is done, and another reference profile can be processed as shown in FIG. 4.

On the other hand, if the determination in 505 is NO, then in 506, the velocity is incremented by the acceleration. By incrementing the velocity in this fashion, chunks will be processed in a more efficient manner. Rather then processing every chunk in a reference profile to see if it is a local maximum, chunks are processed in a quadratically increasing fashion to take advantage of the observation that matches between input profiles and reference profiles usually can be determined early on in the profiles.

The method then loops back to 502 to process the newly calculated chunk offset, and continues looping through 502~506 until the end of the reference profile is determined in 505.

Figure 6:
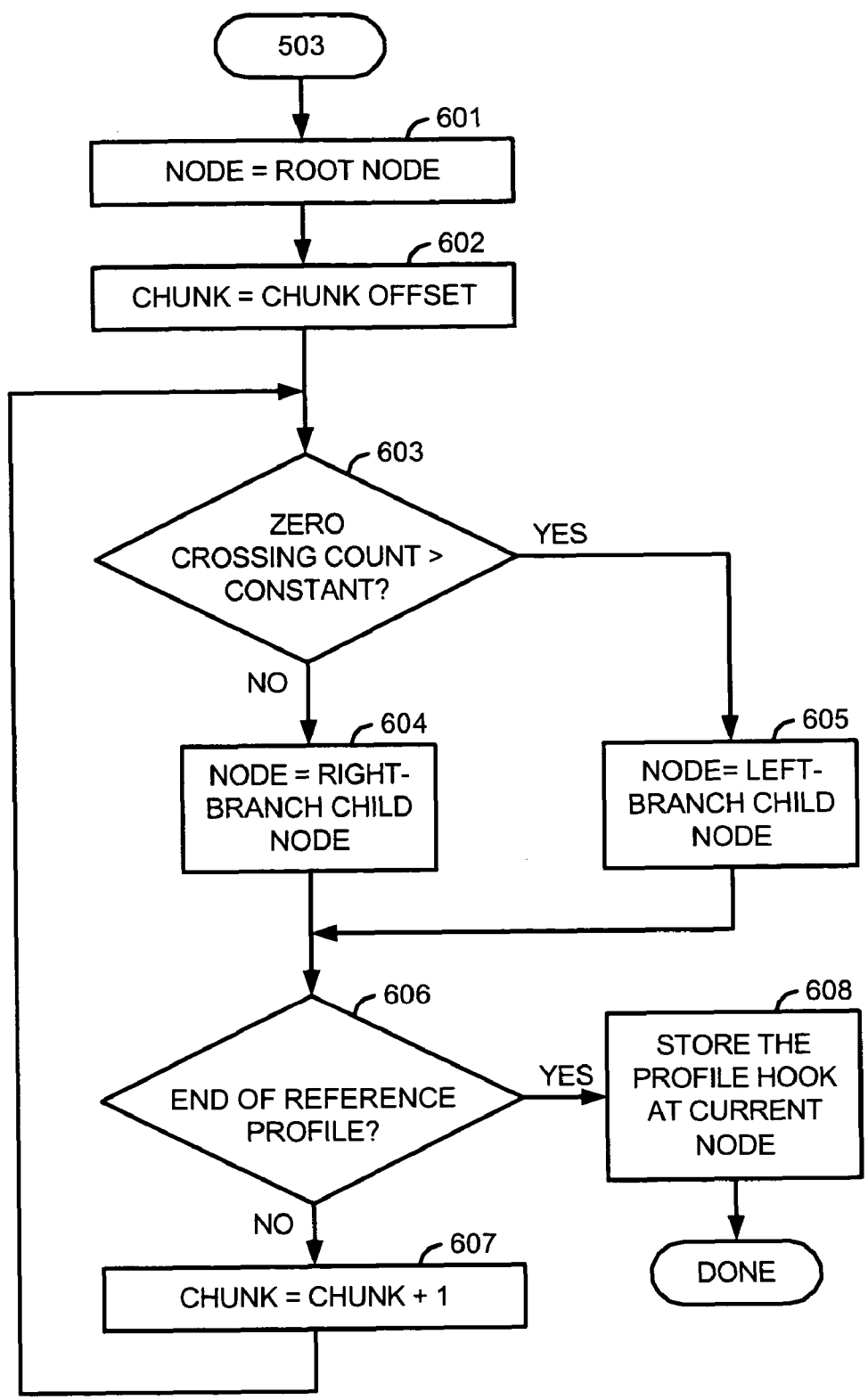
FIG. 6 illustrates a flow diagram of a method for storing a profile hook into a reference profiles tree for each chunk offset of a reference profile identified as being a local maximum, utilizing aspects of the present invention.

FIG. 6 illustrates, as an example, a method performed in function 503 of FIG. 5 to store a profile hook into the reference profiles tree 103 for each chunk offset identified in 502 of FIG. 5 as having a local maximum zero crossing count. In 601 and 602 respectively, the current node at which processing starts on the sparse binary tree is set to its root node and the chunk at which processing starts is set to the chunk offset being processed at the time.

In 603, a determination is made whether the zero crossing count for the current chunk is greater than a programmable constant or threshold value. If the determination in 603 is NO, then in 604, the current node is changed to a right-branch child node, which is created at that time if it doesn't already exist in the reference profiles tree 103. On the other hand, if the determination in 603 is YES, then in 605, the current node is changed to a left-branch child node, which is created at that time if it doesn't already exist in the reference profiles tree 103.

In 606, a determination is then made whether the current chunk is the last chunk in the reference profile. If the determination in 606 is NO, then in 607, the current chunk is incremented by 1, and the method loops back to 603, and continues looping through 603~607 until the determination in 606 is YES. When the determination in 606 is YES, then in 608, the method stores the profile hook in the then current node, and is done. The profile hook in this case includes a profile identification or "ID" and the chunk offset that is being processed at the time in function 503. The profile ID serves to uniquely identify the content of the reference profile in this case.

In the following description, it is now assumed that generation of the reference profiles tree 103 is complete so that it contains information of profile hooks for each of the reference profiles 102 at various of its nodes.

FIG. 7 illustrates, as an example, a method for generating an input profile 101 that parallels the method used for generating each of the reference profiles 102.

Figure 8:
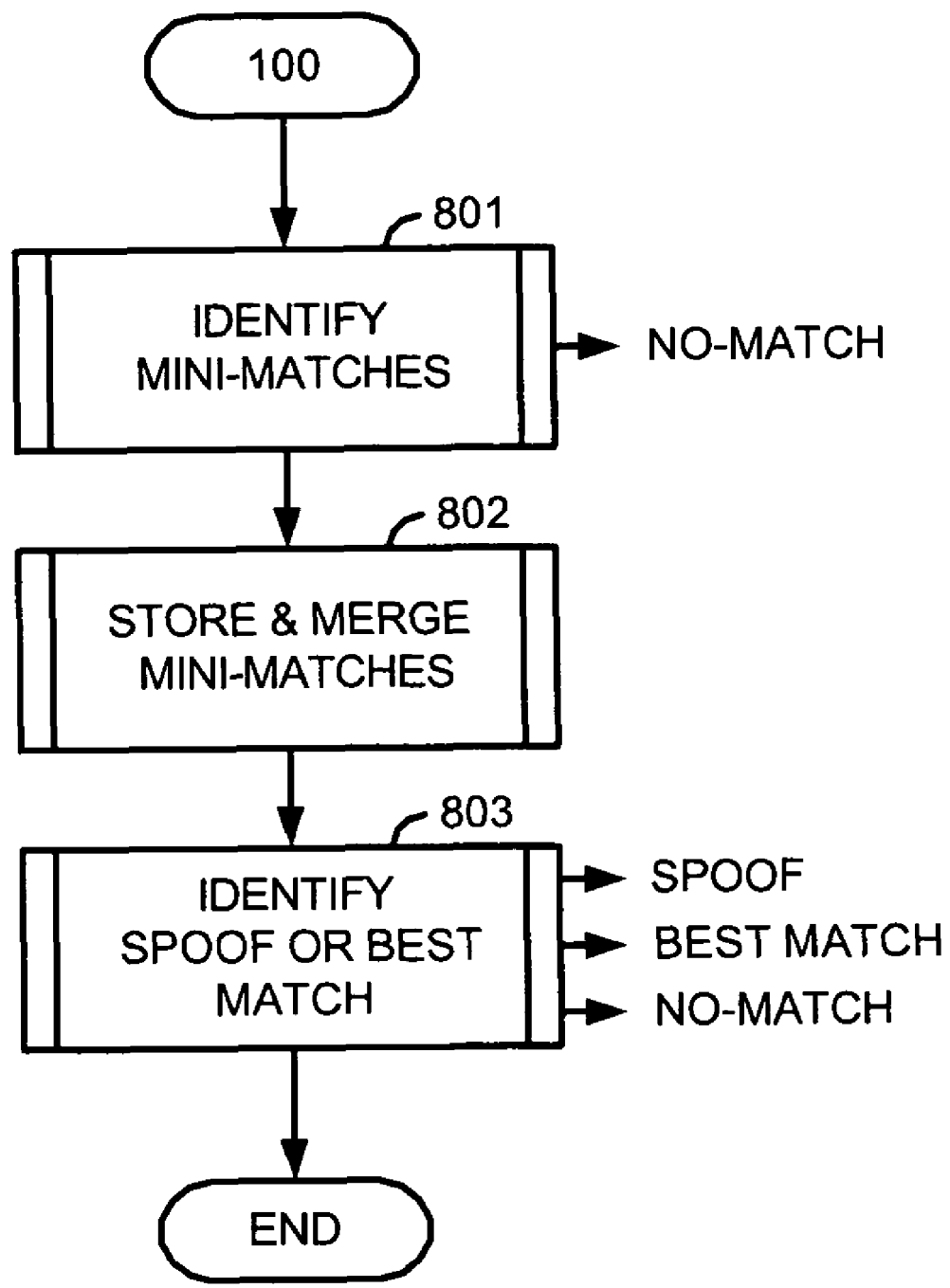
FIG. 8 illustrates a diagram for functions performed by an audio matcher, utilizing aspects of the present invention.

FIG. 8 illustrates three primary functions performed by the audio matcher 100. In a first function 801, the audio matcher 100 identifies mini-matches of an input profile 101 in the reference profiles tree 103. If no mini-matches are found, then this function reports back that the input profile is a no-match. Since the no-match is determined early on in the process, this avoids the necessity to perform subsequent processing to determine a best match or that the input profile is for a spoof.

Assuming mini-matches have been identified between the input profile and one or more reference profiles, then in a second function 802, the audio matcher 100 then stores and merges when appropriate the mini-matches for subsequent processing. In a third function 803, the audio matcher 100 then determines one of the following: an acceptable best match for the input profile; a determination that the input profile is a spoof; or a no-match if the input profile is not determined to be a spoof or if an acceptable best match cannot be found.

Figure 9:
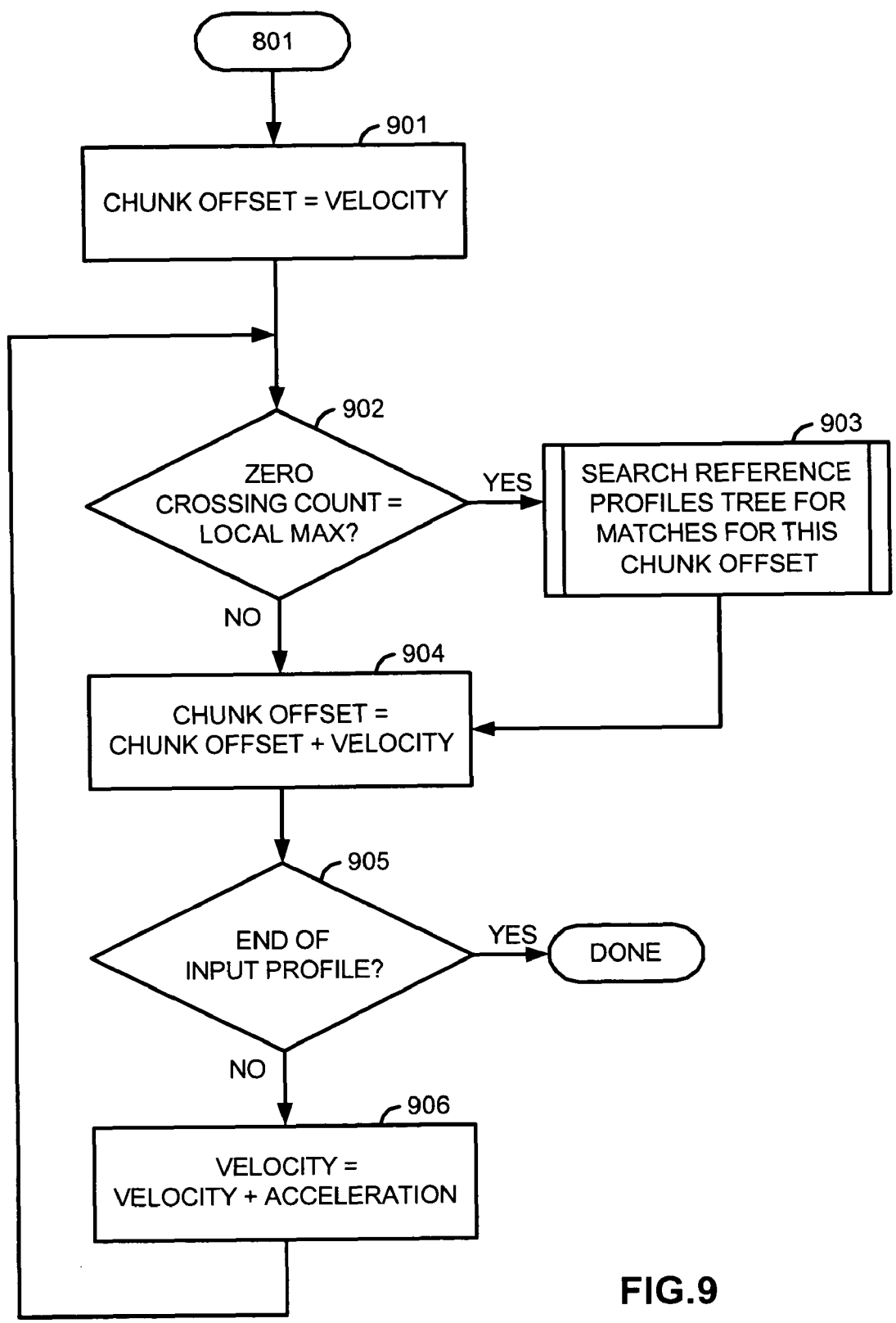
FIG. 9 illustrates a flow diagram of a method for sampling input profile chunks and determining chunk offsets to be used for searching a reference profiles tree for profile hooks, utilizing aspects of the present invention.

FIG. 9 illustrates, as an example, a method for performing the mini-match identifying function 801 of FIG. 8. The method parallels that of FIG. 5, wherein local maximums in a reference profile are identified so that profile hooks can be stored in the reference profiles tree 103. In this case, however, local maximums in the input profile are identified so that mini-matches may be found in the reference profiles tree 103. In particular, the identification of zero crossing count local maximums in the input profile as performed in 901, 902 and 904~906 are performed identically as their counterparts 501, 502 and 504~506 of FIG. 5 in identifying zero crossing count local maximums in a reference profile.

In 903, however, rather than storing a profile hook in the reference profiles tree for the chunk offset as performed in 503 of FIG. 5, the chunk offset is used to search for matches in the reference profiles tree 103.

Figure 10:
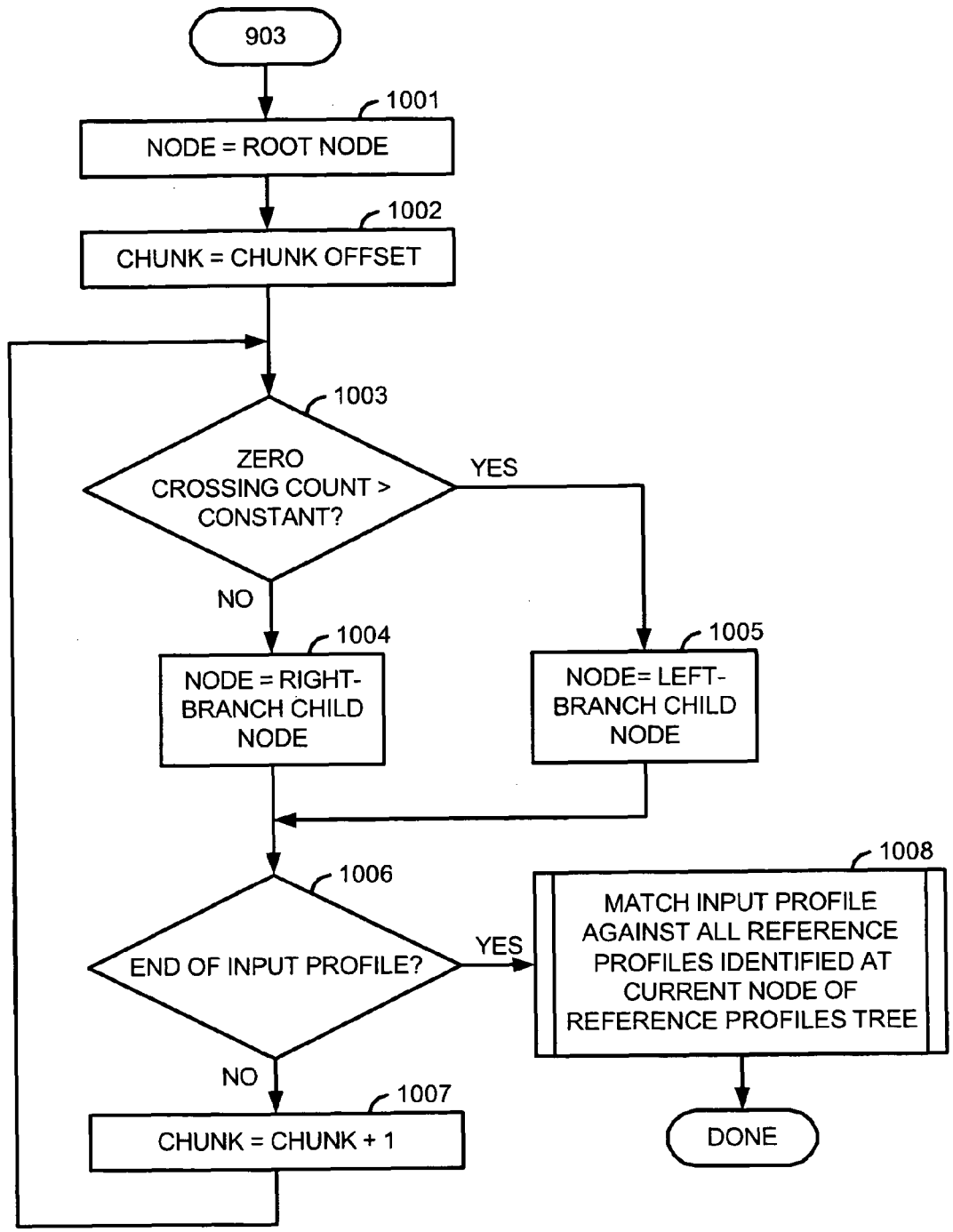
FIG. 10 illustrates a flow diagram of a method for searching a reference profiles tree for profile hooks corresponding to an input profile chunk offset, utilizing aspects of the present invention.

FIG. 10 illustrates, as an example, a method performed in function 903 of FIG. 9. The method is similar to that of FIG. 6, wherein movement down the reference profiles tree 103 is performed. In this case, however, zero crossing counts in the input profile are used instead of the zero crossing counts in a reference profile to determine the movement down the reference profiles tree 103.

Starting in 1001, the current node in the reference profiles tree 103 is initially set to the root node, and in 1002, the current chunk is set to the chunk offset currently being processed.

In 1003, a determination is made whether the zero crossing count for the current chunk is greater than a programmable constant. The constant that is to be used here is the same as that used in 603 of FIG. 6.

If the determination in 1003 is NO, then in 1004, the current node is changed to a right-branch child node. On the other hand, if the determination in 1003 is YES, then in 1005, the current node is changed to a left-branch child node.

In 1006, a determination is then made whether the current chunk is the last chunk in the input profile. If the determination in 1006 is NO, then in 1007, the current chunk is incremented by 1, and the method loops back to 1003, and continues looping through 1003~1007 until the determination in 1006 is YES. When the determination in 1006 is YES, then in 1008, the method matches the input profile against all reference profiles identified in profile hooks stored at the current node of the reference profiles tree 103.

Figure 11:
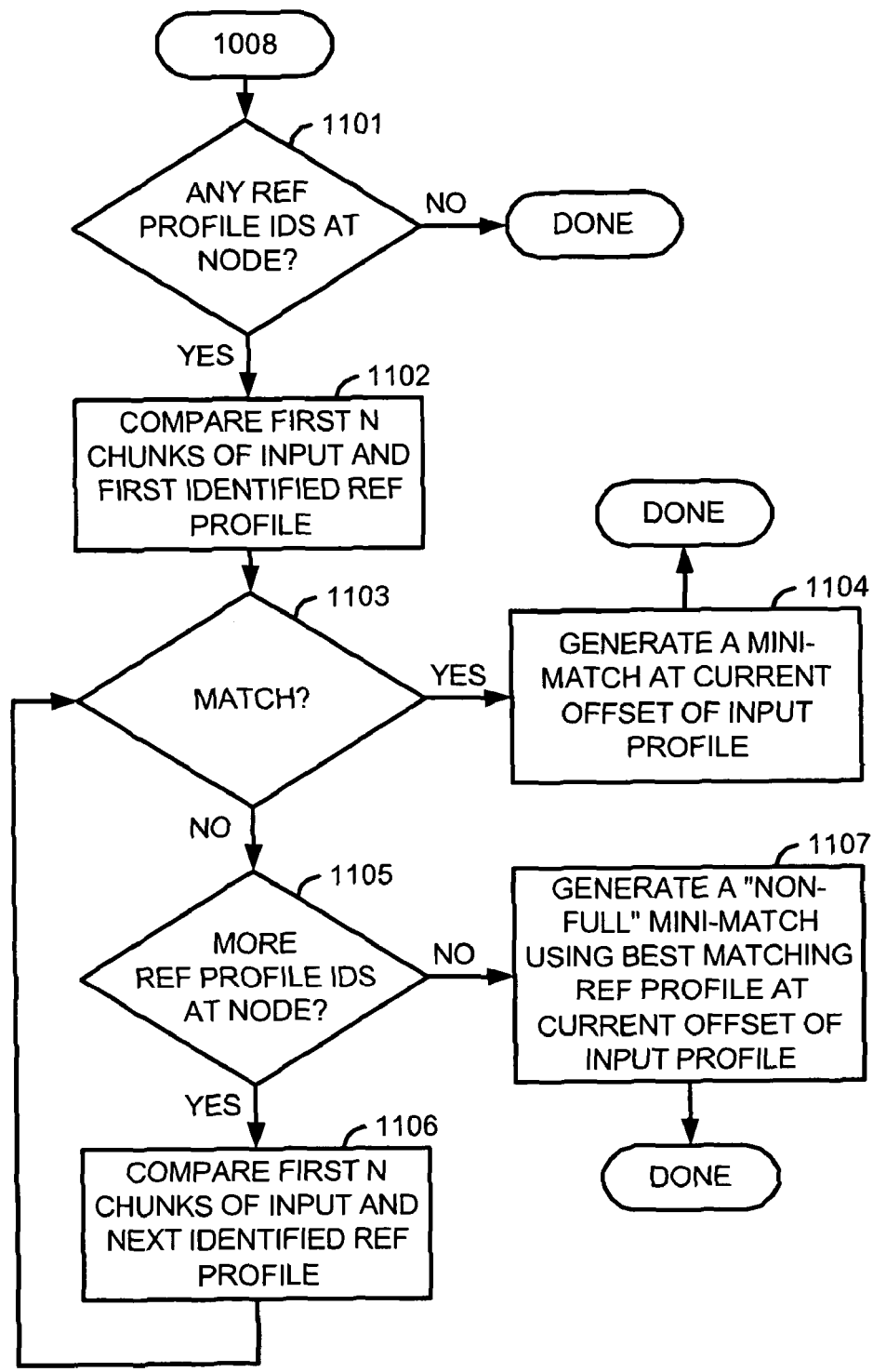
FIG. 11 illustrates a flow diagram of a method for comparing an input profile against reference profiles corresponding to profile hooks retrieved from a reference profiles tree search, utilizing aspects of the present invention.

FIG. 11 illustrates, as an example, a method for performing the function 1008 of FIG. 10. In 1101, a determination is first made whether there are any reference profiles identified in reference profile hooks stored at the current node of the reference profiles tree 103. If the determination in 1101 is NO, then the method has nothing more to do so it ends.

On the other hand, if the determination in 1101 is YES, then in 1102, the first N chunks of the input profile are compared with the corresponding first N chunks of a first reference profile identified. In 1103, a determination is made whether they match. In order for corresponding chunks to match, their zero crossing counts do not have to be exactly equal. As long as the absolute difference between the zero crossing counts is within a programmed tolerance, they may be determined to be a match. Also, it may not be necessary for all of the first N chunks to match, the match determination may be a YES as long as a high enough percentage of the first N chunks match.

If the determination in 1103 is a YES, then in 1104, a mini-match at the current offset of the input profile is generated. Generation of the mini-match involves including the information in the following table in the mini-match.

TABLE 1

Information included in a mini-match.

| Parameter | Description |
| --- | --- |
| $time_1$ | The offset into the input profile at which this match begins. |
| $time_2$ | The offset into the input profile at which this match ends. |
| $wt_1$ | The offset into the input profile at which the reference profile begins. |
| $wt_2$ | The offset into the input profile at which the reference profile ends. |
| time matched | The amount of match time represented by this mini-match. |
| full match | "True" if this is a "full" match. |
| source | The ID for the reference profile corresponding to this mini-match. |
| err | The total amount of error in this mini-match. |
| ID | An identifier for the mini-match. |

On the other hand, if the determination in 1103 is a NO, then in 1105, a determination is made whether there is another reference profile identified at the current node of the reference profiles tree 103. If the determination in 1105 is YES, then in 1106, the first N chunks of the input profile are then compared with those of the next identified reference profile, and the method continues by looping through 1103~1106 until either a match is found or there are no more reference profiles to be compared against the input profile.

If the determination in 1105 results at any time in a NO, then in 1107, the method generates a "non-full" mini-match using the best matching one of the reference profiles identified at the current node of the reference profiles tree 103 (i.e., the reference profile whose first N chunks came closest to being determined as a match to the first N chunks of the input profile). As with the "full" mini-match generated in 1104, the "non-full" mini-match will also be associated to the current offset of the input profile.

Figure 12:
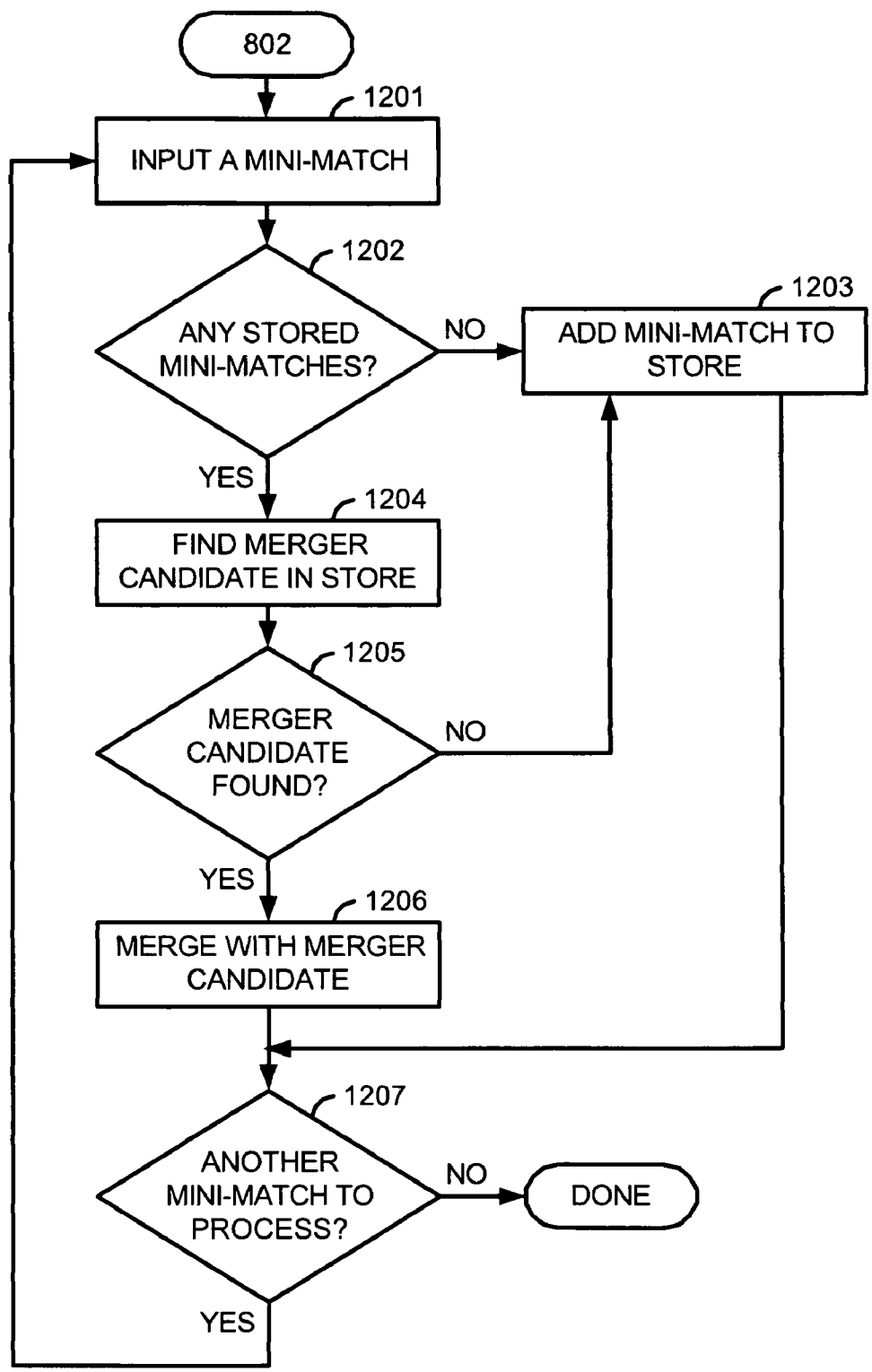
FIG. 12 illustrates a flow diagram of a method for merging mini-matches, utilizing aspects of the present invention.

FIG. 12 illustrates, as an example, a method for performing the mini-match storing and merger function 802 of FIG. 8. In 1201, a first one of the mini-matches generated in the function 801 of FIG. 8 is input. The mini-match can be either a "full" or "non-full" mini-match. In 1202, a determination is made whether any mini-matches have already been stored in the audio matcher 100 for subsequent processing. If the determination in 1202 is NO (as it will be for the first mini-match being input for the input profile), then in 1203, the mini-match is added to the store and the method jumps down to 1207.

In 1207, a determination is then made whether there are any more mini-matches to be input. If the determination in 1207 is YES, then the method jumps back to 1201 to input the next mini-match. In 1202, a determination is once again made whether there are any stored mini-matches. This time, since the first mini-match was stored, the determination will result in a YES, so that the method proceeds to 1204.

In 1204, a search is performed to find a merger candidate for the current mini-match among the mini-matches already in the store. In order to be considered a merger candidate, the current mini-match and the stored mini-match must refer to the same reference profile ID, and any difference between their respective $wt_1$ parameters (offsets into the input profile at which the reference profile begins) must be within a specified tolerance such as 50 chunks or 5 seconds.

In 1205, a determination is then made whether a merger candidate has been found. If the determination in 1205 is NO, then the current mini-match is added to the store in 1203, and the method proceeds from there as previously described.

On the other hand, if the determination in 1205 is YES, then in 1206, the current mini-match is merged with the merger candidate. When merging the current mini-match with the merger candidate, the parameter values for $wt_1$, $wt_2$, $time_1$ and $time_2$ of the merged mini-match are weighted averages of the current mini-match and the merger candidate values, weighted by their respective matched times. The parameter value for "err" of the merged mini-match is the sum of the current mini-match and the merger candidate values. If either the current mini-match or the merger candidate is a "full" match, then the merged mini-match has its full match parameter set to true.

After merger, the method proceeds to 1207.

In 1207, a determination is made whether there are any more mini-matches to be processed. If the determination in 1207 is YES, then the method proceeds by looping through 1201~1207 until all mini-matches have been processed by either being stored individually in the audio matcher store or merged with another mini-match already stored in the audio matcher store, and the determination in 1207 at that time results in a NO.

Figure 13:
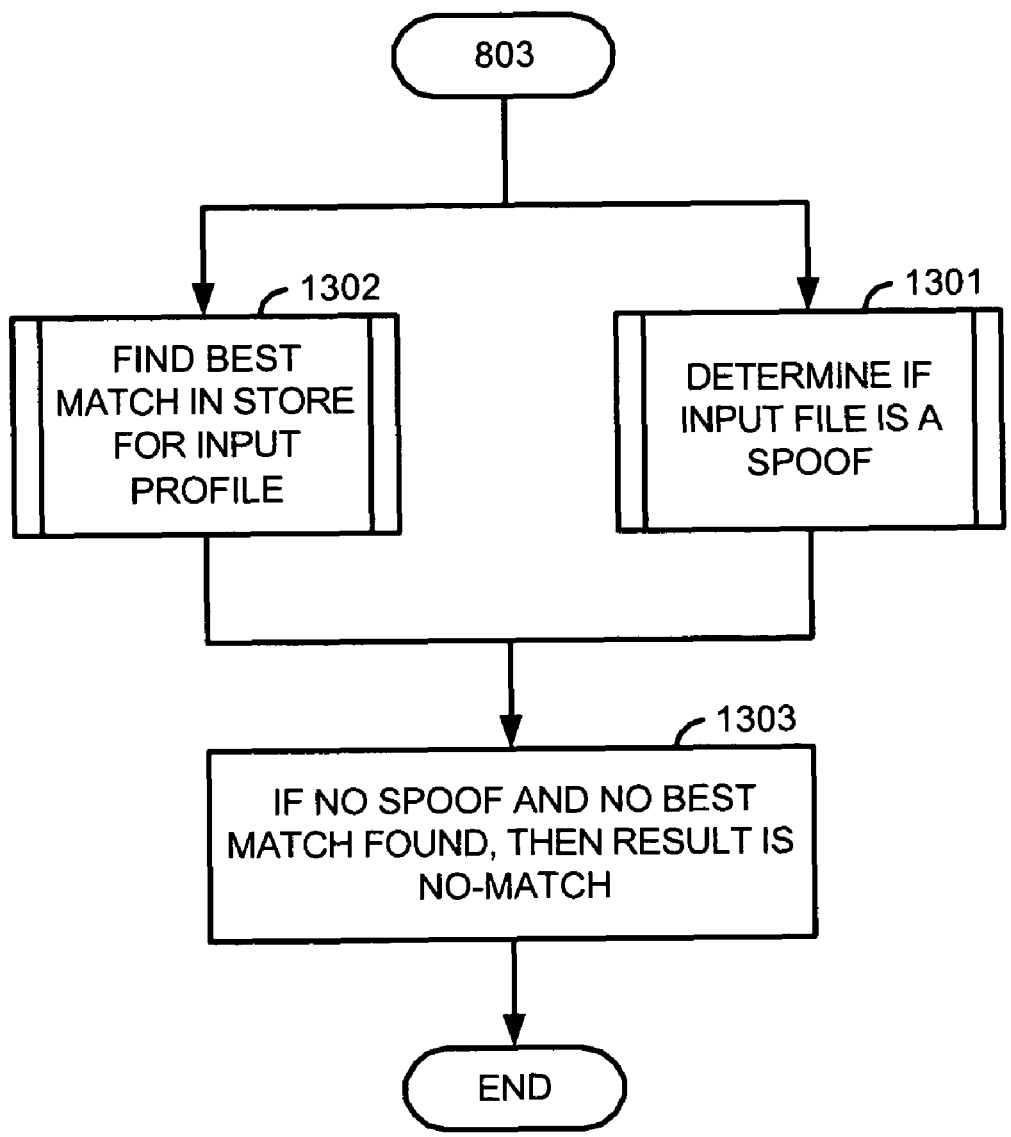
FIG. 13 illustrates a diagram for sub-functions performed by an audio matcher, utilizing aspects of the present invention.

FIG. 13 illustrates, as an example, a software structure for implementing the function 803 of FIG. 8 in which a first function 1301 determines if the input profile is a spoof, and a second function 1302 finds a best match from the store of mini-matches generated in 802 of FIG. 8. The first and second functions 1301 and 1302 may be performed serially, or in parallel as shown. If both functions 1301 and 1302 fail (i.e., the first function 1301 fails to identify the input profile 101 as a spoof and the second function 1302 fails to find an acceptable best match), then in 1303, it is determined that the input profile 101 is a no-match (i.e., no match has been found for it among the reference profiles 102).

Figure 14:
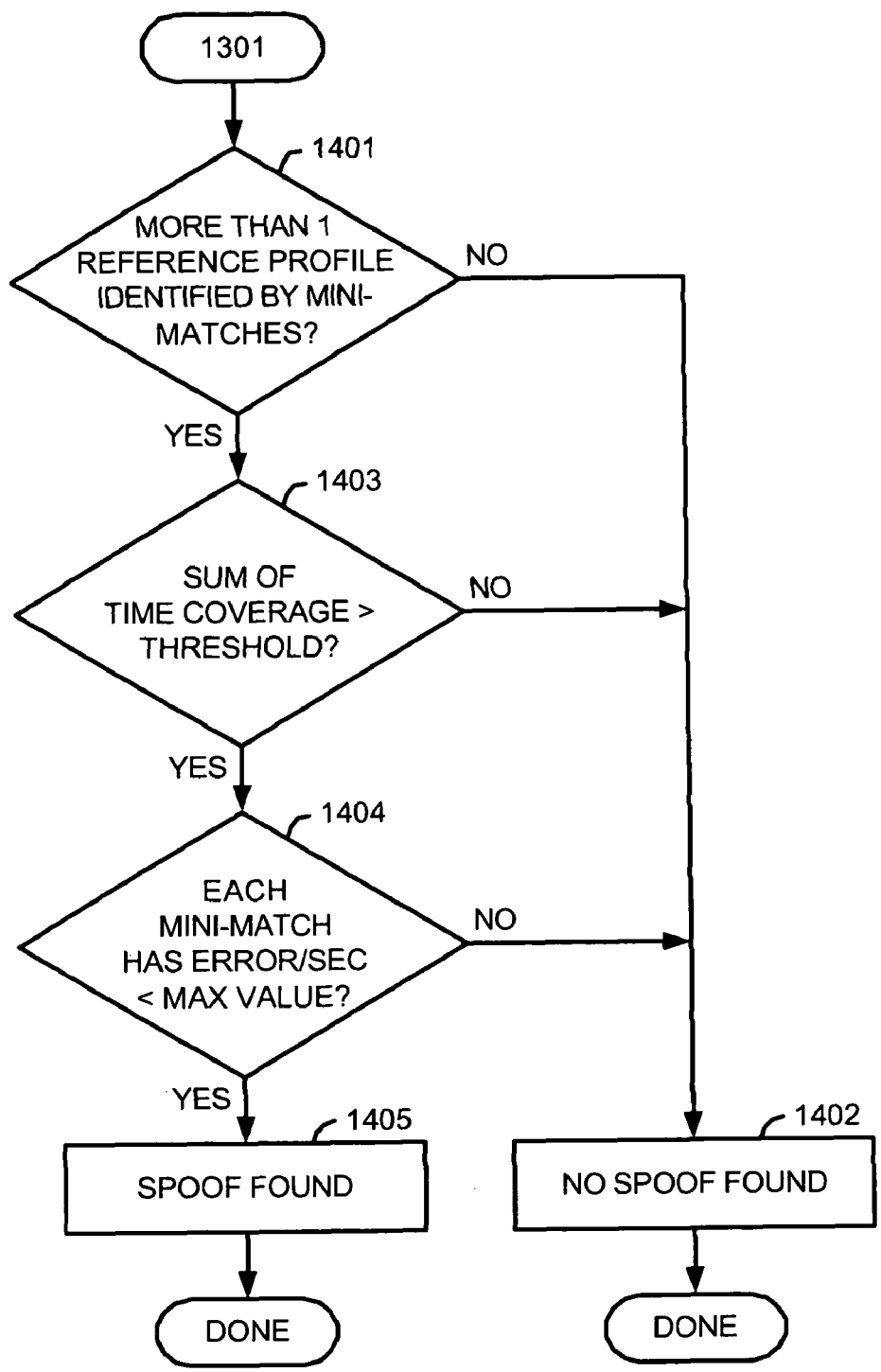
FIG. 14 illustrates a flow diagram of a method for identifying an input file as a spoof file, utilizing aspects of the present invention.

FIG. 14 illustrates, as an example, a method for performing the first function 1301 to determine whether the input profile is a spoof. In 1401, a determination is made whether there is more than one reference profile identified by the mini-matches in the store. If the determination in 1401 results in a NO, then in 1402, a no spoof found conclusion is made and the method stops at that point.

On the other hand, if the determination in 1401 is YES, then in 1403, a determination is made whether the sum of the time matched for all the mini-matches in the store is greater than some threshold percentage of the input profile such as, for example, 70%. If the determination in 1403 results in a NO, then in 1402, a no spoof found conclusion is made and the method stops at that point.

On the other hand, if the determination in 1403 is YES, then in 1404, a determination is made whether each mini-match has an error/second value that is less than some maximum value. The error/second value for each mini-match may be calculated by the ratio of the mini-match's "err" parameter and "time matched" parameter. If the determination in 1404 results in a NO, then in 1402, a no spoof found conclusion is made and the method stops at that point.

On the other hand, if the determination in 1404 is YES, then in 1405, a spoof found conclusion is made and the method stops at that point. In this case, the spoof may be formed by compositing several tracks together or looping the same segment of one track. Since these kinds of spoofs are quite common on peer-to-peer networks, the ability to automatically identify them is useful.

Figure 15:
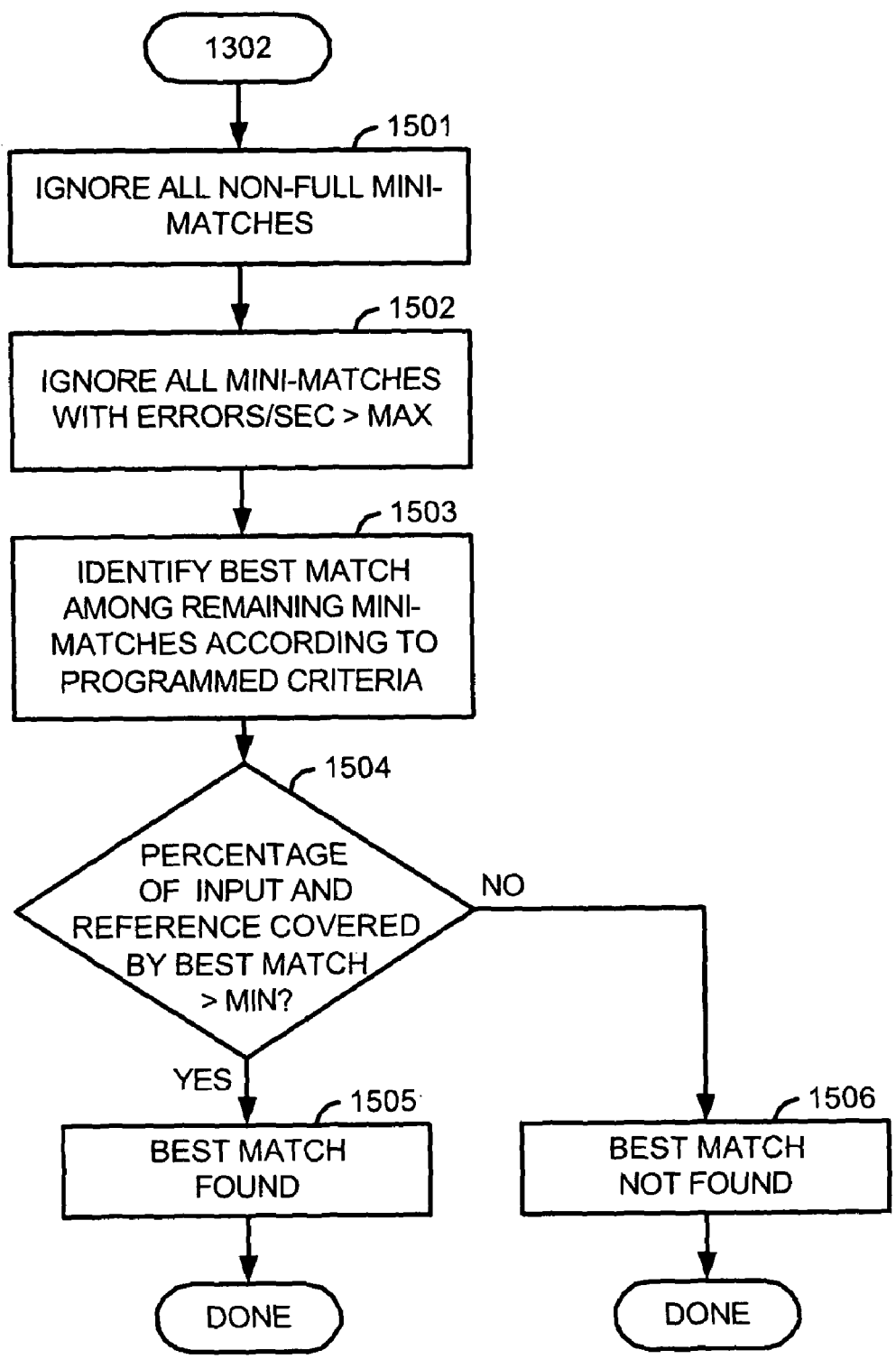
FIG. 15 illustrates a flow diagram of a method for identifying a best match for an input file, utilizing aspects of the present invention.

FIG. 15 illustrates, as an example, a method for performing the second function 1302 to find an acceptable best match for the input profile 101. In 1501 and 1502, the method starts by ignoring all "non-full" mini-matches and all mini-matches having an errors/second greater than a maximum allowable value.

In 1503, the method then identifies one of the remaining mini-matches as a best match according to programmed criteria such as its errors/second value, its time matched value, and the percentage of its reference profile that it recognizes. Typically, the best match will be a mini-match that exceeds all other mini-matches in all of these criteria. In the event that two mini-matches are close, some weighting of the criteria may be performed to determine a best match between the two.

In 1504, a determination is then made whether the percentage of the input profile and the reference profile covered by the best match exceeds some minimum value. If the determination in 1504 is YES, then in 1505, the best match identified in 1503 is concluded to be an acceptable best match and the method ends at that point. On the other hand, if the determination in 1504 is NO, then the best match identified in 1503 is concluded in 1506 to be an unacceptable best match and the method ends at that point with a conclusion in this case that no acceptable best match was found.

Although the various aspects of the present invention have been described with respect to a preferred embodiment, it will be understood that the invention is entitled to full protection within the full scope of the appended claims.

We claim:

1. A method for matching an input audio file with a plurality of reference audio files, comprising:

generating an input profile by segmenting the input audio file into chunks and determining a value for a characteristic attribute of each of the chunks;

identifying chunks of the input profile whose characteristic attribute values satisfy a criterion;

determining nodes of a sparse binary tree that are associated with individual of the plurality of reference audio files to identify potential matches tor the input audio file by processing, for and only for each chunk of the input profile whose characteristic attribute value satisfies the criterion, all chunks from the characteristic attribute value satisfying chunk to a last chunk of the input profile so as to move down left and right branch child nodes of the sparse binary tree starting from a root node wherein the determination of whether to move down the left or right branch child node for each chunk being processed depends upon whether the chunk being processed has a characteristic attribute value greater than a specified value; and searching for a match of the input audio file among the potential matches.

2. The method according to claim 1, further comprising: generating, prior to identifying potential matches for the input audio file, a plurality of reference profiles from corresponding ones of the plurality of reference audio files by segmenting each reference audio file into chunks and determining a value for the characteristic attribute for each of the chunks.

3. The method according to claim 2, wherein the plurality of reference profiles are associated with nodes of the sparse binary tree by identifying chunks of the plurality of reference profiles whose characteristic attribute values satisfy the criterion and processing, for and only for each chunk whose characteristic attribute value satisfies the criterion, all chunks from the characteristic attribute value satisfying chunk to a last chunk of its reference profile down left and right branch child nodes of the sparse binary tree starting with the root node wherein the determination of whether to move down the left or right branch child node for each chunk being processed depends upon whether the chunk being processed has a characteristic attribute value greater than the specified value so that upon completion of such processing, a profile hook identifying the reference audio file of the chunk being processed is stored at a current node upon completion of the processing for the characteristic attribute value satisfying chunk.

4. The method according to claim 3, wherein individual chunks of the input audio file includes information of digitized samples of an audio clip over a period of time and the characteristic attribute is a number of zero crossings of the digitized samples in the chunk.

5. The method according to claim 4, wherein the criterion is satisfied if the zero crossing count of a chunk is a local maximum.

6. The method according to claim 3, wherein the identification of chunks whose characteristic attribute values satisfy the criterion is performed on an ever increasing sampling basis.

7. The method according to claim 6, wherein the ever increasing sampling basis is a quadratically increasing sample basis.

8. The method according to claim 6, wherein the ever increasing sampling basis is an exponentially increasing sample basis.

9. The method according to claim 6, wherein the identification of chunks whose characteristic attribute values satisfy the criterion is performed by incrementing through the chunks at a specified velocity and acceleration.

10. The method according to claim 9, wherein the velocity is the number of chunks between local maxima in the input profile and the acceleration is the change in velocity divided by the number of chunks over which the change occurs.

11. The method according to claim 3, wherein the identification of potential matches for the input audio file with the plurality of reference profiles comprises identifying potential mini-matches by retrieving profile hooks associated with nodes in the sparse binary tree.

12. The method according to claim 11, wherein the identification of mini-matches among the plurality of reference profiles further comprises for individual reference profiles corresponding to the retrieved profile hooks:

comparing a number of chunks of the input profile and corresponding chunks of the reference profile; and identifying a mini-match if corresponding chunks of the reference profile substantially matches those of the input profile.

13. The method according to claim 12, wherein the identification of mini-matches among the plurality of reference profiles further comprises: identifying a non-full mini-match using a best matching one of the reference profiles with the input profile if none of the reference profiles identified by the profile hooks substantially matches those of the input profile.

14. The method according to claim 13, wherein the identification of potential matches further comprises: merging any mini-matches and non-full mini-matches corresponding to the same reference profile and having an offset into the input profile at which the reference profile begins within a specified tolerance.

15. The method according to claim 14, wherein if a mini-match is merged with a non-full mini-match, then the merged entity is referred to as a mini-match.

16. The method according to claim 15, further comprising: identifying the input audio file as a spoof if all mini-matches identified for the input profile do not refer to the same reference profile.

17. The method according to claim 16, wherein the input audio file is not identified as a spoof if the sum of the total audio time covered by the mini-matches is less than a specified threshold value.

18. The method according to claim 17, wherein the input audio file is not identified as a spoof even if the sum of the total audio time covered by the mini-matches is not less than the specified threshold value or if any of the mini-matches has an associated error per second value that is greater than a first specified maximum value.

19. The method according to claim 18, wherein the searching for the match results in a best match being found if a percentage of the input profile and the reference profile covered by the best match exceeds some minimum value after ignoring all non-full mini-matches, ignoring mini-matches having an error per second value that is greater than a second specified maximum value, and taking into consideration any other programmed criteria.

20. An apparatus for matching an input audio file with a plurality of reference audio files, comprising at least one computer configured to: generate an input profile by segmenting the input audio file into chunks and determining a value for a characteristic attribute of each of the chunks; identify chunks of the input profile whose characteristic attribute values satisfy a criterion; determine nodes of a sparse binary tree that are associated with individual of the plurality of reference audio files to identify potential matches for the input audio file by processing, for and only for each chunk of the input profile whose characteristic attribute value satisfies the criterion, all chunks from the characteristic attribute value satisfying chunk to a last chunk of the input profile so as to move down left and right branch child nodes of the sparse binary tree starting from a root node wherein the determination of whether to move down the left or right branch child node for each chunk being processed depends upon whether the chunk being processed has a characteristic attribute value greater than a specified value; and search for a match of the input audio file among the potential matches.

21. The apparatus according to claim 20, wherein the at least one computer is further configured to: generate, prior to identifying potential matches for the input audio file, a plurality of reference profiles from corresponding ones of the plurality of reference audio files by segmenting each reference audio file into chunks and determining a value for the characteristic attribute for each of the chunks.

22. The apparatus according to claim 21, wherein the at least one computer is configured to generate the plurality of reference profiles so as to be associated with nodes of the sparse binary tree by identifying chunks of the plurality of reference profiles whose characteristic attribute values satisfy the criterion and processing, for and only for each chunk whose characteristic attribute value satisfies the criterion, all chunks from the characteristic attribute value satisfying chunk to a last chunk of its reference profile down left and right branch child nodes of the sparse binary tree starting with the root node wherein the determination of whether to move down the left or right branch child node for each chunk being processed depends upon whether the chunk being processed has a characteristic attribute value greater than the specified value so that upon completion of such processing, a profile hook identifying the reference audio file of the chunk being processed is stored at a current node upon completion of the processing for the characteristic attribute value satisfying chunk.

23. The apparatus according to claim 22, wherein the at least one computer is configured to generate individual of the chunks of the input audio file so as to include information of digitized samples of an audio clip over a period of time and the characteristic attribute is a number of zero crossings of the digitized samples in the chunk.

24. The apparatus according to claim 23, wherein the criterion used by the at least one computer is satisfied if the zero crossing count of a sampled chunk is a local maximum.

25. The method according to claim 22, wherein the at least one computer is configured to identify the chunks whose characteristic attribute values satisfy the criterion on an increasing sampling basis.

26. The apparatus according to claim 25, wherein the increasing sampling basis used by the at least one computer is a quadratically increasing sample basis.

27. The apparatus according to claim 25, wherein the increasing sampling basis used by the at least one computer is an exponentially increasing sample basis.

28. The apparatus according to claim 25, wherein the at least one computer is configured to identify the chunks whose characteristic attribute values satisfy the criterion by incrementing through the chunks at a specified velocity and acceleration.

29. The apparatus according to claim 28, wherein the velocity used by the at least one computer is the number of chunks between local maxima in the input profile and the acceleration used by the at least one computer is the change in velocity divided by the number of chunks over which the change occurs.

30. The apparatus according to claim 22, wherein the at least one computer is configured to identify potential matches for the input audio file with the plurality of reference profiles by identifying potential mini-matches by retrieving profile hooks associated with nodes in the sparse binary tree.

31. The apparatus according to claim 30, wherein the at least one computer is configured to identify the mini-matches for individual reference profiles corresponding to the retrieved profile hooks by comparing a number of chunks of the input profile and corresponding chunks of the reference profile and identifying a mini-match if corresponding chunks of the reference profile substantially matches those of the input profile.

32. The apparatus according to claim 31, wherein the at least one computer is configured to identify the mini-matches by identifying a non-full mini-match using a best matching one of the reference profiles with the input profile if none of the reference profiles identified by the profile hooks substantially matches those of the input profile.

33. The apparatus according to claim 32, wherein the at least one computer is configured to identify the potential matches by merging any mini-matches and non-full mini-matches corresponding to the same reference profile and having an offset into the input profile at which the reference profile begins within a specified tolerance.

34. The apparatus according to claim 33, wherein the at least one computer is configured so that if a mini-match is merged with a non-full mini-match, then the merged entity is referred to as a mini-match.

35. The apparatus according to claim 34, wherein the at least one computer is configured to identify the input audio file as a spoof if all mini-matches identified for the input profile do not refer to the same reference profile.

36. The apparatus according to claim 35, wherein the at least one computer is configured to not identify the input audio file as a spoof if the sum of the total audio time covered by the mini-matches is less than a specified threshold value.

37. The apparatus according to claim 36, wherein the at least one computer is configured to not identify the input audio file as a spoof even if the sum of the total audio time covered by the mini-matches is not less than the specified threshold value of if any of the mini-matches has an associated error per second value that is greater than a first specified maximum value.

38. The apparatus according to claim 37, wherein the at least one computer is configured to search for the match so as to result in a best match being found if a percentage of the input profile and the reference profile covered by the best match exceeds some minimum value after ignoring all non-full mini-matches, ignoring mini-matches having an en-or per second value that is greater than a second specified maximum value, and taking into consideration any other programmed criteria.

* * * * *